United States Patent [19]

Mortemard de Boisse

[11] Patent Number: 5,443,387
[45] Date of Patent: Aug. 22, 1995

[54] PLANNING TOOL INCLUDING SUPPORT HAVING DELIMITED RECEPTION ZONES TO RECEIVE MOVABLE SLIPS

[75] Inventor: Jérôme Mortemard de Boisse, Boulogne, France

[73] Assignee: Avenay Partners S.A.R.L., Boulogne, France

[21] Appl. No.: 958,113

[22] Filed: Dec. 23, 1992

[30] Foreign Application Priority Data

Jun. 26, 1989 [FR] France ................ 89 08450

[51] Int. Cl.⁶ ........................................ G09B 19/18
[52] U.S. Cl. ................ 434/108; 434/238; 434/430
[58] Field of Search ........... 434/108, 109, 238, 430, 434/107; 40/610; 281/31, 44, 30

[56] References Cited

U.S. PATENT DOCUMENTS

| | | | |
|---|---|---|---|
| 2,914,873 | 12/1959 | Brennan | 434/430 X |
| 3,358,395 | 12/1967 | Simonovic | 434/108 X |
| 3,629,960 | 12/1971 | Roush | 434/430 X |
| 3,843,166 | 10/1974 | Barone | 281/44 |
| 4,652,241 | 3/1987 | McCarty | 434/430 X |
| 4,669,754 | 6/1987 | Lalonde | 283/67 |
| 4,803,795 | 2/1989 | Questel et al. | |
| 4,859,187 | 8/1989 | Peterson | 434/108 |
| 4,907,904 | 3/1990 | Baldwin | 402/80 R |
| 4,973,184 | 11/1990 | La Salle | 402/70 |
| 4,995,641 | 2/1991 | Landry et al. | 283/67 |

FOREIGN PATENT DOCUMENTS

| | | |
|---|---|---|
| 2524676 | 10/1983 | France . |
| 2602082 | 1/1988 | France . |
| 8504892 | 2/1985 | Germany . |
| 8514721 | 7/1985 | Germany . |

OTHER PUBLICATIONS

Aircraft Production, vol. 22, No. 8, Aug. 1960 (Londres, GB) "Programming chart", p. 320.

*Primary Examiner*—Gene Mancene
*Assistant Examiner*—Jeffrey A. Smith
*Attorney, Agent, or Firm*—Charles E. Baxley

[57] ABSTRACT

A planning too includes at least one set of detachable slips and at least one support, one side of which can temporarily receive slips in a given order. The slips each have a side which can be written on and a side partially coated with a pressure-sensitive adhesive allowing the slips to be stuck down, unstuck and stuck down again repeatedly. The slips are taken from a pad of slips which is mounted on the support.

7 Claims, 2 Drawing Sheets

PLANNING TOOL INCLUDING SUPPORT HAVING DELIMITED RECEPTION ZONES TO RECEIVE MOVABLE SLIPS

BACKGROUND OF THE INVENTION

The present invention relates to a tool for organization and/or planning comprising at least one series of movable slips and at least one support, at least one face of which is adapted in order temporarily to receive the said slips in a determined and changeable order of classification.

In tools of this type, in general called schedules, the move slips generally consist of a T-shaped piece of cardboard whose vertical bar is adapted to penetrate into a slot provided in the support, while the horizontal bar abuts against the edges of the said slot, the elements of information written on the said horizontal bar thus remaining visible.

In order to be able to withstand manipulations, these T-shape slips must be sufficiently rigid, and this is why they are made of cardboard. It follows that a store of slips has a non-negligible thickness (approximately 2 cm per 100 slips, to which it is necessary to add the thickness of the case containing them). Let us add to this that when we are dealing with the production of a portable schedule, it is necessary for each support to be lined (hence an increase in thickness) because the vertical bar of the T-shaped slips which are inserted through the slots made in the support slide between the latter and the said lining. As a consequence of these problems of thickness, existing portable schedules do not include a store of slips, except for a few virgin slips inserted in the unused slots.

The aim of the present invention is to provide a novel tool for organisation and/or planning which eliminates these drawbacks.

For this purpose, according to the invention, the slips consist of paper tickets having one face which can be written on and one face which is partly coated with a pressure-sensitive adhesive allowing repeated sticking, unsticking and resticking, the said tickets, called "transferable" tickets, being taken from at least one pad of such tickets with which the tool itself is provided.

As transferable tickets capable of being used according to the invention, use may be made of those known under the trademark Post-it ®. Since they are made of paper, these tickets constitute slips which are much thinner than known T-shaped slips (a pad of 100 tickets has a thickness of approximately 1 cm) and since they are stuck to each other, they do not need to be included in a case. Furthermore, as they are immobilized in place by sticking, they do not require a slotted support, or lining of the support by a rear face. It therefore follows that the thickness of the support is also reduced. By virtue of this set of characteristics, it is possible to include in the organization tool one or more stores of slips, that is to say pads of tickets.

Advantageously, the tool is provided with a collection of different pads of transferable tickets, the pads differing in color and/or format and/or comment text or the geometry of invariable lines drawn on the said tickets.

Preferably, the face of the said transferable tickets which can be written on is subdivided into an identification/classification zone and an annotation zone.

This identification/classification zone will take the place of the horizontal bar of the T-shaped slips, while the annotation zone will take the place of the vertical bar.

For this purpose, the support face adapted in order temporarily to receive the said transferable tickets has zones for receiving the tickets with partial overlap between them leaving uncovered their identification/classification zone.

The tool according to the invention advantageously includes several supports juxtaposed edge to edge and hinged together along the edges of juxtaposition, forming, according to the number of supports, a diptych, a triptych, etc.

In a preferred embodiment, the tool furthermore includes at least one other support joined pivotally to two supports belonging to a diptych, triptych, etc. at one of the hinges of the latter.

DESCRIPTION OF THE DRAWINGS

Other characteristics and advantages of the invention will emerge from the description made below with reference to the attached drawings in which.

DETAILED DESCRIPTION OF THE INVENTION

Figure 1:
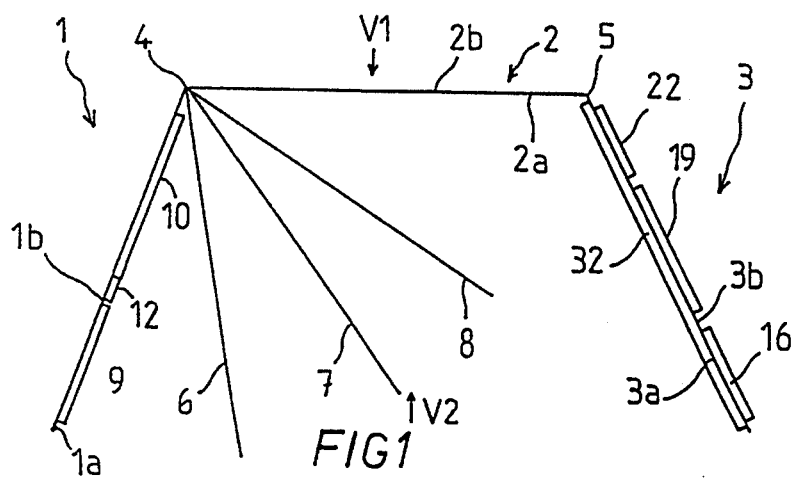
FIG. 1 represents a top view of the tool for organisation and/or planning according to the invention in the partially opened state.

With reference to FIG. 1, it is seen that the tool for organization and/or planning consists of three flaps 1, 2 and 3 mounted in a tryptych, that is to say that flap 1 and flap 2 are hinged along their joining line 4, while flap 2 and flap 3 are hinged along their joining line 5. Along the joining and hinge line 4 there are mounted three additional flaps 6, 7 and 8. The internal face 1a of flap 1 is provided with a collection of pads 9 to 15 of transferable tickets printed with comments such as "I AM SENDING YOU THIS DOCUMENT FOR", "IN YOUR ABSENCE", etc.

Figure 4:
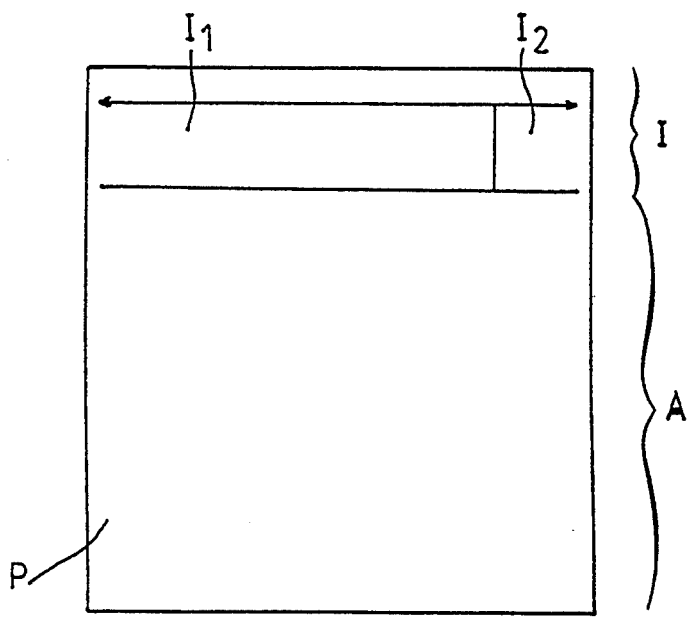
FIGS. 4 and 5 are embodiments of tickets according to the invention.
Figure 5:
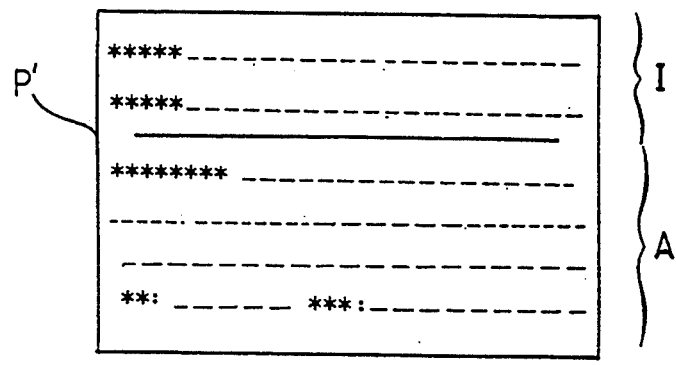
Figure 2:
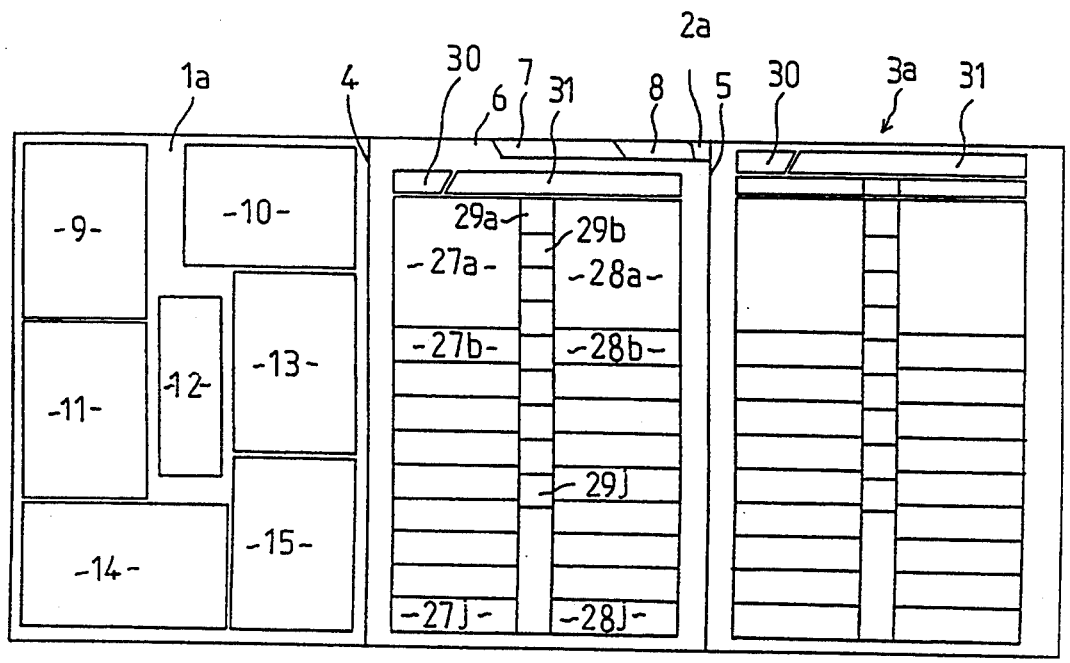
FIG. 2 is a view taken along the arrow V1 in FIG. 1 of the tool according to the invention placed completely flat.
Figure 3:
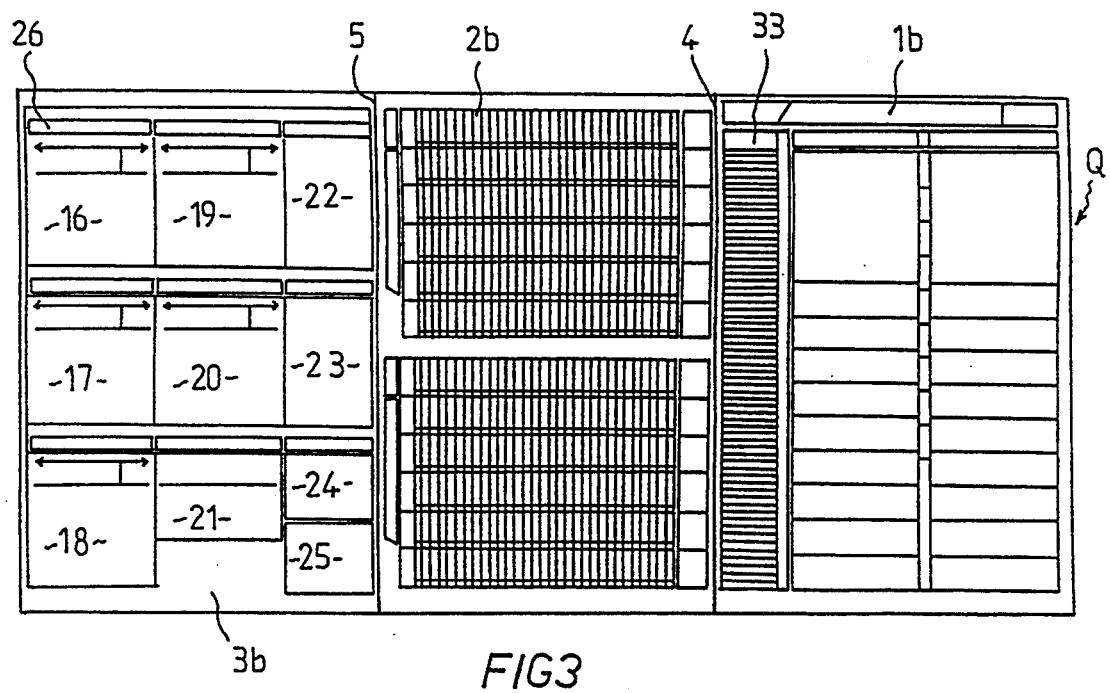
FIG. 3 is a similar view to FIG. 2 but along the arrow V2.

In the same way, the external face 3b of the flap 3 is provided with a collection 16 to 25 of pads of tickets which differ from each other in their color and/or their format and/or the comments or lines which are printed thereon. Thus for example the tickets P of the pads 16 to 20 will be able to be of a different color and to have a line as represented in FIG. 4. This line defines the identification zone I and an annotation zone A. The identification zone I is itself subdivided into an identification zone proper I1 and for example a date or code zone I2.

The tickets P' of the pad 21 will be able, for their part, to be printed with the standard headings of an address book, for example the headings NAME and TELEPHONE on a zone equivalent to zone I in FIG. 4 and with headings ADDRESS TELEX and FAX on a zone equivalent to the annotation zone A in FIG. 4.

Each pad in the collection 16 to 24 is surmounted by a framed zone such as 26 indicating the destination of the pad of tickets found below.

The face 3a of the flap 3 is provided with a pad 32 of tear-off sheets Q which will be dealt with further on. The flaps 6, 7, 8, 2a and the sheets Q constitute supports adapted to receive tickets taken from the collection 16 to 25 after sorting according to the user's own criteria and which will be able to be indicated in the spaces 30 and 31. The supports 6 to 8, 2a, Q have lines which define locations such as 27a–27j and 28a–28j adapted to receive the tickets taken from the collection 16 to 20 in contact with partial overlap leaving visible the identification one I. Between the column of spacer 27a–27j and the column of spacer 28a–28j, there is provided a column of spacer 29a–29j for numbering the identification/classification zones of the tickets disposed on either side of the said column. Thus, for example, there will be stuck onto space 27a a ticket P1 mentioning a task to be performed with first priority, and onto space 28a a ticket P2 mentioning a task to be performed with secondary priority. A ticket P3 mentioning a task to be performed with third priority will be stuck onto the ticket P1 at the height of the space 29b leaving visible the zone I of the said ticket P1. In the same way, the ticket P4 indicating an activity of fourth priority will be stuck at the level of the zone 29b on the ticket P2 leaving visible the identification zone of the said ticket P2, and so on.

The sheets Q of the pad 32 with which the face 1b of the triptych is equipped, will be able to allow sorting and storing of the activities of the day by transferring the tickets sorted and stored by sectors of activity, or in another way, onto the flaps 6 to 8 and 2a. The sheets Q will thus be able to have a relatively similar composition to that of the flaps, namely two columns of transferable-ticket receiving spaces, the left column being for example reserved for the entries MEETINGS, PEOPLE TO SEE or WHO TO TELEPHONE and the right column for the opt:rations to be carried out. It will furthermore be possible to provide on the left a column 33 divided into quarter-hour zones in order to write down the appointments of the day.

Finally, take face 2b the flap 2 may be printed with a year calendar.

The device according to the invention is used as follows:

As it becomes necessary to perform some operation or other, this operation is written down on the top ticket of the appropriate pad in the collection 16 to 20, the ticket in question is unstuck from its pad and stored on the appropriate flap 6–8 or 2a while arranging it in the desired order o f urgency to be dealt with. The tickets which are already on this flap may possibly be reclassified as a function of the introduction of the new ticket. The tickets thus sorted and stored on the flaps 6–8 and 2a are then when due, transferred onto the top sheet Q of the pad 32 of operations to be performed during the day or possibly onto the subjacent sheets if it is desired to prepare in advance daily sheets for the next day or the day after next. It is obvious that it is just as well possible to prepare one week, two weeks or a whole month in advance, for all activities or at least for priority activities. As the operations of the day are performed, the corresponding tickets may either be destroyed if the assignment is completed, or be again stored on one of the flaps 6–8 or 2a in order to resume the assignment at a suitable time, or be classified on a support sheet included in the files of the corresponding assignments. At the end of the day, the daily activity sheet Q is removed, and underneath appears the sheet for the next day. The sheet removed may be photocopied before its tickets are removed and the photocopy stored as a complete record of the activity of the day.

The original sheet, with its tickets removed, but keeping the appointments or other entices written on it will be able to be stored separately.

The tickets of the pads 9 to 15 are used for the functions which follow from the comments which are printed on them and the tickets 22 to 25 may be for any use.

The tickets of the pad 21 are themselves used to constitute an at least provisional address book on an appropriate support.

It emerges from the preceding description that the invention provides a tool for organization and/or planning which, in a small volume, presents the user with the collections of "slips" which he requires and allows sorting, storage and changeable selections of the various slips. It also emerges from the description that the invention gives another application for pads of transferable tickets which, hitherto, were only used to enter information on a document or an object without using external attachment means such as staples, paperclips or adhesive tapes, while allowing immediate removal without leaving marks.

It is obvious that the present invention is not limited to the embodiment described and represented. In particular, the tool according to the invention could include a different number of flaps, the flaps could have a different relative position forming a notebook, a file, a bound pad, etc., the pads of tickets could be arranged in another manner, a pad of sheets forming a weekly schedule could be provided as well as or instead of that forming the daily schedule.

I claim:

1. A planning tool comprising at least one series of movable slips with each of said slips having a first face and a second face,
   a pressure sensitive adhesive layer deposited on and partially covering each of said second faces of said movable slips,
   first support means having two opposite surfaces, with a first of said surfaces having a plurality of distinct and delimited reception zones for receiving said slips in a changeable order of classification, with said reception zone positioned to receive said slips with partial overlap between said slips so that only a portion of each slip is visible,
   a pad of said slips mounted on said first surface.

2. A planning tool comprising at least one series of movable slips with each of said slips having a first face and a second face,
   a pressure sensitive adhesive layer deposited on and partially covering each of said second faces of said movable slips,
   first support means having two opposite surfaces, with a first of said surfaces having a plurality of distinct and delimited reception zones for receiving said slips in a changeable order, with said reception zones proportioned to receive said slips with partial overlap between said slips,
   second support means,
   first hinged connection means connecting said first support means end said second support means,
   third support means, and
   second hinged connection means connecting said first hinged connection means and said third support means, and with at least one pad of said slips mounted on said first support means.

3. A planning tool according to claim 2, with said second support means having a plurality of distinct and delimited receiving zones for receiving said slips.

4. A planning tool according to claim 2, comprising a plurality of pads of said slips and in which said plurality of pads of slips are differentiated by color, and a geometrical arrangement of lines drawn on said first faces of said slips.

5. A planning tool according to claim 2, in which said second support means comprises a first surface and in which said first surface of said second support means comprises a time schedule with said time schedule having receiving zones for receiving said slips.

6. A planning tool according to claim 2, further comprising a pad of sheets mounted on said second support means with each of said sheets comprising a time schedule and reception zones for receiving said slips.

7. A planning tool according to claim 2, in which each of said slips comprises an identification zone and an annotation zone, with said reception zones proportioned so that said partial overlap of said slips leaves said identification zones uncovered.

* * * * *